United States Patent
Lütgehetmann et al.

(10) Patent No.: US 12,541,876 B2
(45) Date of Patent: Feb. 3, 2026

(54) PROCESSING IMAGES OF OBJECTS AND OBJECT PORTIONS, INCLUDING MULTI-OBJECT ARRANGEMENTS AND DEFORMED OBJECTS

(71) Applicant: INAIT SA, Lausanne (CH)

(72) Inventors: Daniel Milan Lütgehetmann, Lausanne (CH); Dimitri Zaganidis, Granges (CH); Nicolas Alain Berger, Fribourg (CH); Felix Schürmann, Grens (CH)

(73) Assignee: INAIT SA, Lausanne (CH)

( * ) Notice: Subject to any disclaimer, the term of this patent is extended or adjusted under 35 U.S.C. 154(b) by 603 days.

(21) Appl. No.: 17/654,647

(22) Filed: Mar. 14, 2022

(65) Prior Publication Data

US 2023/0206493 A1 Jun. 29, 2023

(30) Foreign Application Priority Data

Dec. 23, 2021 (GR) .............................. 20210100909

(51) Int. Cl.
  *G06T 7/73* (2017.01)
  *G06T 7/00* (2017.01)
  *G06T 7/246* (2017.01)

(52) U.S. Cl.
  CPC .............. *G06T 7/75* (2017.01); *G06T 7/0002* (2013.01); *G06T 7/251* (2017.01); *G06T 7/74* (2017.01)

(58) Field of Classification Search
  CPC .. G06T 7/74; G06T 7/251; G06T 7/75; G06T 7/0002; G06T 7/73; G06T 2207/30164
  See application file for complete search history.

(56) References Cited

U.S. PATENT DOCUMENTS 6,246,954 B1  6/2001 Berstis et al.
6,826,301 B2  11/2004 Glickman
(Continued)

FOREIGN PATENT DOCUMENTS

CN    1658559     8/2005
CN    102376071   3/2012
(Continued)

OTHER PUBLICATIONS

International Preliminary Report on Patentability in International Appln. No. PCT/EP2022/085055, mailed on Jul. 4, 2024, 11 pages.
(Continued)

*Primary Examiner* — Tracy Mangialaschi
(74) *Attorney, Agent, or Firm* — Fish & Richardson P.C.

(57) ABSTRACT

A method of image processing can include receiving an image of an instance of an object and a three-dimensional model of the object, detecting a first plurality of landmarks of the instance of the object in the two-dimensional image, estimating a pose of the instance of the object in the received image relative to an imaging device that acquired the image, wherein the relative pose in the received image is estimated from the first plurality of the detected landmarks, using the estimated relative pose, projecting landmarks from the three-dimensional model of the object into a dimensional space of the received image of the instance of the object, comparing, in the dimensional space, characteristics of corresponding of the projected landmarks and the first plurality of the detected landmarks, and determining whether a threshold level of positional correspondence exists between positions of corresponding of the projected landmarks and the first plurality of the detected landmarks.

16 Claims, 6 Drawing Sheets

(56) References Cited

U.S. PATENT DOCUMENTS

| | | |
|---|---|---|
| 6,969,809 B2 | 11/2005 | Rainey |
| 7,889,931 B2 | 2/2011 | Webb et al. |
| 8,515,152 B2 | 8/2013 | Siri |
| 8,712,893 B1 | 4/2014 | Brandmaier et al. |
| 9,262,789 B1 | 2/2016 | Tofte |
| 9,307,234 B1 | 4/2016 | Greiner et al. |
| 9,489,696 B1 | 11/2016 | Tofte |
| 9,870,609 B2 | 1/2018 | Kompalli et al. |
| 9,886,771 B1 | 2/2018 | Chen et al. |
| 10,580,075 B1 | 3/2020 | Brandmaier et al. |
| 10,657,647 B1* | 5/2020 | Chen .................. G06T 7/254 |
| 10,657,707 B1 | 5/2020 | Leise |
| 10,789,786 B2 | 9/2020 | Zhang et al. |
| 2002/0007289 A1 | 1/2002 | Malin et al. |
| 2004/0113783 A1 | 6/2004 | Yagesh |
| 2004/0183673 A1 | 9/2004 | Nageli |
| 2005/0108065 A1 | 5/2005 | Dorfstatter |
| 2006/0103568 A1 | 5/2006 | Powell et al. |
| 2006/0114531 A1 | 6/2006 | Webb et al. |
| 2006/0124377 A1 | 6/2006 | Lichtinger et al. |
| 2006/0267799 A1 | 11/2006 | Mendelson |
| 2007/0164862 A1 | 7/2007 | Dhanjal et al. |
| 2008/0255887 A1 | 10/2008 | Gruter |
| 2008/0267487 A1 | 10/2008 | Siri |
| 2008/0281658 A1 | 11/2008 | Siessman |
| 2009/0033540 A1 | 2/2009 | Breed et al. |
| 2009/0256736 A1 | 10/2009 | Orr |
| 2010/0067420 A1 | 3/2010 | Twitchell, Jr. |
| 2010/0073194 A1 | 3/2010 | Ghazarian |
| 2010/0100319 A1 | 4/2010 | Trinko et al. |
| 2010/0106413 A1 | 4/2010 | Mudalige |
| 2010/0265104 A1 | 10/2010 | Zlojutro |
| 2010/0265325 A1 | 10/2010 | Lo et al. |
| 2010/0271196 A1 | 10/2010 | Schmitt et al. |
| 2011/0068954 A1 | 3/2011 | McQuade et al. |
| 2011/0102232 A1 | 5/2011 | Orr et al. |
| 2012/0029759 A1 | 2/2012 | Suh et al. |
| 2012/0029764 A1 | 2/2012 | Payne et al. |
| 2012/0062395 A1 | 3/2012 | Sonnabend et al. |
| 2014/0229207 A1 | 8/2014 | Swamy et al. |
| 2014/0309805 A1 | 10/2014 | Ricci |
| 2015/0063627 A1* | 3/2015 | Mohammad .......... G06T 7/0004 382/103 |
| 2015/0287130 A1 | 10/2015 | Vercollone et al. |
| 2016/0239922 A1 | 8/2016 | Jimenez |
| 2017/0011294 A1 | 1/2017 | Jagannathan |
| 2017/0293894 A1 | 10/2017 | Taliwal |
| 2018/0040039 A1 | 2/2018 | Wells et al. |
| 2018/0182039 A1 | 6/2018 | Wang et al. |
| 2018/0189949 A1 | 7/2018 | Lapiere et al. |
| 2018/0197048 A1 | 7/2018 | Micks |
| 2018/0260793 A1 | 9/2018 | Li et al. |
| 2018/0293552 A1 | 10/2018 | Zhang et al. |
| 2018/0293664 A1 | 10/2018 | Zhang et al. |
| 2018/0293806 A1 | 10/2018 | Zhang et al. |
| 2018/0300576 A1 | 10/2018 | Dalyac et al. |
| 2019/0213563 A1 | 7/2019 | Zhang et al. |
| 2019/0213689 A1 | 7/2019 | Zhang et al. |
| 2019/0213804 A1 | 7/2019 | Zhang et al. |
| 2020/0236343 A1 | 7/2020 | Holzer et al. |
| 2021/0183097 A1* | 6/2021 | Georgakis .......... G06V 20/653 |
| 2021/0209797 A1* | 7/2021 | Lee .................. G06T 17/00 |
| 2022/0245860 A1 | 8/2022 | Atanasoaei et al. |

FOREIGN PATENT DOCUMENTS

| | | |
|---|---|---|
| CN | 103310223 | 9/2013 |
| CN | 104268783 | 1/2015 |
| CN | 104517442 | 4/2015 |
| CN | 105488576 | 4/2016 |
| CN | 105488789 | 4/2016 |
| CN | 105678622 | 6/2016 |
| CN | 105719188 | 6/2016 |
| CN | 105956667 | 9/2016 |
| CN | 106021548 | 10/2016 |
| CN | 106022929 | 10/2016 |
| CN | 106056451 | 10/2016 |
| CN | 106127747 | 11/2016 |
| CN | 106203644 | 12/2016 |
| CN | 106250812 | 12/2016 |
| CN | 106296118 | 1/2017 |
| CN | 106296126 | 1/2017 |
| CN | 106370128 | 2/2017 |
| CN | 106372651 | 2/2017 |
| CN | 106504248 | 3/2017 |
| JP | H 0778022 | 3/1995 |
| JP | H0981739 | 3/1997 |
| JP | 2001344463 | 12/2001 |
| JP | 2002183338 | 6/2002 |
| JP | 2003132170 | 5/2003 |
| JP | 2003170817 | 6/2003 |
| JP | 2003196511 | 7/2003 |
| JP | 2003226230 | 8/2003 |
| JP | 2003346021 | 12/2003 |
| JP | 2005107722 | 4/2005 |
| JP | 2006164022 | 6/2006 |
| JP | 3839822 | 11/2006 |
| JP | 2007233997 A | 9/2007 |
| JP | 2011215973 | 10/2011 |
| JP | 5321784 | 12/2013 |
| JP | 2015184143 | 10/2015 |
| JP | 2017062776 | 3/2017 |
| JP | 2018112999 | 7/2018 |
| JP | 2018537798 | 12/2018 |
| KR | 20160018944 | 2/2016 |
| KR | 20160019514 | 2/2016 |
| KR | 20170016778 | 2/2017 |
| TW | M478859 | 5/2014 |
| WO | WO 2005109263 | 11/2005 |
| WO | WO 2013093932 | 6/2013 |
| WO | WO 2017055878 | 4/2017 |
| WO | WO 2020/014170 A1 | 1/2020 |

OTHER PUBLICATIONS

Office Action in U.S. Appl. No. 17/179,596, mailed on Jul. 2, 2024, 20 pages.
International Search Report and Written Opinion in International Appln. No. PCT/EP2022/085055, mailed on Mar. 28, 2023, 16 pages.
docs.com [online], "Open Source Computer Vision, " available on or before Jul. 4, 2022, retrieved on Sep. 29, 2022, retrieved from URL<https://docs.opencv.org/4.x/d7/d53/tutorial_py_pose.html>, 3 pages.
github.com [online], "Detectron2," available on or before Oct. 11, 2019, retrieved on Sep. 29, 2022, retrieved from URL<https://github.com/facebookresearch/detectron2>, 4 pages.
International Search Report and Written Opinion in International Appln. No. PCT/EP2022/051810, dated May 13, 2022, 14 pages.
Lin et al., "iNeRF: Inverting Neural Radiance Fields for Pose Estimation," arXiv:2012.05877v3, Dec. 10, 2020, 9 pages.
Opencv.org [online], "Camera calibration and 3D reconstructions," Jul. 18, 2020,retrieved from URL <https://docs.opencv.org/4.4.0/d0/doc/group_calin3d.html#gas549c2075fac14829ff4a58bc931c033d>, 78 pages.
Opencv.org [online], "Pose Estimation," Mar. 15, 2021, retrieved from URL <https://docs.opencv.org/master/d7/d53/tutorial_py_pose.html>, 3 pages.
Ren et al. "Faster R-CNN: Towards real-Time Object Detection With Region Proposal Networks"; IEEE Transactions on Pattern Analysis and Machine Intelligence; 2017, 39(6):1137-1149.
Rodrigues et al., "Confidence factor and feature selection for semi-supervised multi-label classification methods," 2014 International Joint Conference on Neural Networks (IJCNN), Beijing, 2014, pp. 864-871, doi: 10.1109/IJCNN.2014.6889564, 2014.
Wang, "Structural Damage Monitoring Based on Vibration Modal Analysis and Neural Network Technique," China Master's Theses Full-Text Database Information Technology, Jan. 2004, 91 pages (with English abstract).

(56) References Cited

OTHER PUBLICATIONS

Wikipedia.org [online], "Harris Corner Detector," Jan. 21, 2021, retrieved on Mar. 5, 2021, retrieved from URL <https://en.wikipedia.org/wiki/Harris_Corner_Detector>, 6 pages.
Wikipedia.org [online], "OPTICS algorithm," Feb. 1, 2021, retrieved on Mar. 5, 2021, retrieved on URL <https://en.wikipedia.org/wiki/OPTICS_algorithm>, 5 pages.
Wikipedia.org [online], "Scale-invariant feature transform," Feb. 15, 2021, retrieved on Mar. 5, 2021, retrieved on URL <https://en.wikipedia.org/wiki/Scale-invariant_feature_transform>, 16 pages.
Wikipedia.org [online}, "DBSCAN," Feb. 13, 2021, retrieved on Mar. 5, 2021, retrieved from URL <https://en.wikipedia.org/wiki/DBSCAN>, 8 pages.
Xiang et al., "Beyond pascal: A benchmark for 3d object detection in the wild," InIEEE winter conference on applications of computer vision, Mar. 24, 2014 pp. 75-82.
Yongming et al., "Research on honeycomb sandwich composite structure damage detection based on matching pursuit method," Chinese Journal of Scientific Instrument, 2012, 33(4):836-842 (with English abstract).
Zhang et al., "Vehicle global 6-DoF pose estimation under traffic surveillance camera," ISPRS Journal of Photogrammetry and Remote Sensing, Jan. 1, 2020, 159:114-28.
Drover et al., Can 3D Pose be Learned from 2D Projections Alone? Proceedings of the European Conference on Computer Vision (ECCV) Workshops (Year: 2018).
Greenspan et al., "Automatic Detection of Anatomical Landmarks in Uterine Cervix Images," IEEE Transactions on Medical Imaging, vol. 28, No. 3, pp. 454-468 (Year: 2009).
Grimm et al., "Pose-dependent weights and Domain Randomization for fully automatic X-ray to CT Registration," arXiv: 2011.07294v1 (Year: 2020).
Harris et al., "A combined corner and edge detector," Alvey Vision Conference, vol. 15, No. 50, pp. 147-152 (Year: 1988).
International Preliminary Report on Patentability in International Appln. No. PCT/US2022/051810, mailed on Aug. 17, 2023, 8 pages.
Office Action in U.S. Appl. No. 17/179,596, dated Dec. 29, 2023, 20 pages.
Sim et al., "Learning Visual Landmarks for Pose Estimation," Proceedings of the 1999 IEEE International Conference on Robotics & Automation, pp. 1972-1978 (Year: 1999).
Terada et al., "3D Facial Landmark Detection Using Deep Convolutional Neural Networks," 14th International Conference on Natural Computation, Fuzzy Systems and Knowledge Discovery (ICNC-FSKD), pp. 390-393 (Year: 2018).
Torres et al., "Deep learning-based detection of anthropometric landmarks in 3D infants head models," Medical Imaging 2019: Computer-Aided Diagnosis, vol. 10950, pp. 791-797 (Year: 2019).
Zhao et al., "Cascaded Shape Space Pruning for Robust Facial Landmark Detection," Conference on Computer Vision (ICCV), pp. 1033-1040 (Year: 2013).
Bier et al., "Learning to detect anatomical landmarks of the pelvis in X-rays from arbitrary views," International journal of computer assisted radiology and surgery, Sep. 2019, 14:1463-73.
Office Action in Japanese Appln. No. 2024-533141, mailed on Oct. 24, 2025, 8 pages (with uncertified machine translation).

\* cited by examiner

PROCESSING IMAGES OF OBJECTS AND OBJECT PORTIONS, INCLUDING MULTI-OBJECT ARRANGEMENTS AND DEFORMED OBJECTS

CROSS-REFERENCE TO RELATED APPLICATIONS

This application claims the benefit of priority to Greek Application No. 20210100909, filed Dec. 23, 2021. The entire contents of the foregoing are hereby incorporated by reference.

TECHNICAL FIELD

This specification relates to processing of objects and object portions, including multi-object arrangements and deformed objects.

BACKGROUND

Image processing is a type of signal processing in which the processed signal is an image. An input image can be processed, e.g., to produce an output image or a characterization of the image.

One example of image processing is pose estimation. As discussed further below, pose estimation is a process whereby the relative positions and orientations of an imaging device and an object are estimated from a two-dimensional image. Pose estimates can be based on other results of image processing. One example is landmark recognition. In landmark recognition, two-dimensional images are processed to identify landmarks and their positions in the images. The identity and position of landmarks are examples of results on which pose estimates can be based.

SUMMARY

In a first aspect, a method of image processing includes receiving an image of an instance of an object and a three-dimensional model of the object, detecting a first plurality of landmarks of the instance of the object in the two-dimensional image, estimating a pose of the instance of the object in the received image relative to an imaging device that acquired the image, wherein the relative pose in the received image is estimated from the first plurality of the detected landmarks, using the estimated relative pose, projecting landmarks from the three-dimensional model of the object into a dimensional space of the received image of the instance of the object, comparing, in the dimensional space, characteristics of corresponding of the projected landmarks and the first plurality of the detected landmarks, and determining whether a threshold level of positional correspondence exists between positions of corresponding of the projected landmarks and the first plurality of the detected landmarks.

Implementations of the first aspect—or of the second or third aspects—can include one or more of the following features. The method can include detecting a plurality of landmarks of the instance of the object in the image, wherein the detected plurality includes more landmarks than the first plurality of landmarks, and selecting the first plurality of landmarks from amongst the landmarks in the detected plurality. The selection of the first plurality can be random. The selection of the first plurality of landmarks can be guided by a property of the landmarks. The property can be how certain it is that a given of the landmarks has been properly detected.

The method can include, in response to determining that the threshold level of positional correspondence does not exist: again estimating the relative pose of the instance of the object in the first 1 image from a second plurality of landmarks of the instance of the object detected in the first image, wherein at least some of the landmarks in the second plurality differ from the landmarks in the first plurality, using the again-estimated relative pose, projecting landmarks from the three-dimensional model of the object into the dimensional space of the received image of the instance of the object, comparing characteristics of corresponding of the projected landmarks and the second plurality of the detected landmarks in the dimensional space, and determining whether the threshold level of positional correspondence exists between positions of corresponding of the projected landmarks and the second plurality of the detected landmarks.

The method of can also include selecting the second plurality of landmarks of the instance of the object. The second plurality can be selected by, e.g., identifying corresponding of the projected landmarks and of the landmarks in the first plurality with relatively large positional differences and excluding the landmarks in the first plurality with the relatively large differences from the second plurality. The second plurality can be selected by, e.g., identifying a location of corresponding of the projected landmarks and of the two-dimensional landmarks in the first plurality with a relatively large positional difference; and excluding, from the second plurality, landmarks in the first plurality that are in the vicinity of the corresponding projected landmark and detected landmark with the relatively large positional difference. The second plurality can be selected by, e.g., identifying directions of positional deviations of corresponding of the projected landmarks and of the detected landmarks, and excluding, from the second plurality landmarks in the first plurality that have a direction of positional deviation that differs from the directions of positional deviation of a majority of the positional deviations of corresponding of the projected landmarks and of the detected landmarks.

The method can include, in response to determining that the threshold level of positional correspondence does exist, identifying a subset of the landmarks of the instance of the object detected in the image with relatively large deviations from the corresponding projected landmarks, and drawing a conclusion about the instance of the object based on the subset of the detected landmarks. The conclusion can designate a portion of the instance of the object as deformed or damaged. The conclusion can quantify a magnitude of the relatively large positional deviations, a direction of the relatively large positional deviations, or both the magnitude and the direction.

A threshold level of positional correspondence can be determined to exist by combining positional differences of a plurality of corresponding projected landmarks and detected landmarks and comparing the combination of the positional differences with a threshold. The relative pose of the instance of the object can be estimated by forming a first estimation of the relative pose of the instance of the object in the received image, determining that a quality of the first relative pose estimation is insufficient, and in response, forming a second estimation of the relative pose of the instance of the object in the received image.

The method can include receiving a second image of the instance of the object, detecting a second plurality of landmarks of the instance of the object in the second image acquired by a second imaging device, estimating a pose of the instance of the object in the second image relative to the second imaging device that acquired the second image, wherein the relative pose in the second image is estimated from the second plurality of the detected landmarks, and, using the estimated relative pose of the instance of the object and the estimated relative pose of the instance of the object in the second image, projecting landmarks from the three-dimensional model of the object into the dimensional space of the second image.

The method can also include comparing, in the dimensional space, characteristics of corresponding of a) the landmarks projected using the estimated relative pose of the instance of the object in the second image, and b) the second plurality of the detected landmarks, and determining whether a threshold level of correspondence exists between the compared characteristics of corresponding of the projected landmarks and the first plurality of the detected landmarks. The image of the instance can be a two-dimensional image. The detected landmarks can be two-dimensional landmarks. The dimensional space of the received image can be two-dimensional space. The characteristics of corresponding of the projected landmarks and the second plurality of the detected landmarks that are compared can be positional characteristics in two-dimensional space.

In a second aspect, a method includes detecting landmarks of an instance of an object in an image of the instance of the object, estimating a pose of the instance of the object relative to an imaging device that acquired the image, using the estimated pose, projecting landmarks from a three-dimensional model of the object into a dimensional space of the image of the instance of the object, identifying corresponding of the projected landmarks and detected landmarks, comparing, in the dimensional space, characteristics of corresponding of the projected landmarks and detected landmarks to determine deviations of the corresponding landmarks, identifying a subset of the corresponding landmarks that have deviations that exceed a threshold, and identifying a deformation, a movement, or an obscuration of either the instance of the object or a portion of the instance of the object based on the identified subset.

Implementations of the second aspect—or of the first or third aspects—can include one or more of the following features. Identifying the deformation, the movement, or the obscuration can include identifying a damaged site of the instance of the object. Identifying the deformation, the movement, or the obscuration can include detecting landmarks of the instance of the object in a second image of the instance of the object and identifying the deformation, the movement, or the obscuration based on positions of the landmarks detected in the second image. The method can include identifying a cluster of spatially-close landmarks of the subset of the corresponding landmarks that have the positional deviations; and identifying the deformation or the movement of the object based on the cluster of the spatially-close landmarks.

Identifying the corresponding of the landmarks can include comparing contexts of projected and detected landmarks to identify the corresponding landmarks. The image of the instance can be a two-dimensional image. The detected landmarks can be two-dimensional landmarks. The dimensional space of the received image can be two-dimensional space. The characteristics that are compared to determine deviations can be two-dimensional positional characteristics.

In a third aspect a method for identifying differences between two-dimensional images can include receiving a first two-dimensional image and a second two-dimensional image, wherein each of the first image and the second image includes at least a portion of a same instance of an object; receiving a three-dimensional model of the object, detecting a first plurality of two-dimensional landmarks of the instance of the object in the first image and a second plurality of two-dimensional landmarks of the instance of the object in the second image, estimating poses of the instance of the object in each of the first image and the second images relative to one or more imaging devices that acquired the first and second two-dimensional images, using at least one of the estimated relative poses, projecting landmarks from the three-dimensional model of the object into two-dimensional space, comparing, in two-dimensional space, positions of corresponding of the projected landmarks and the detected two-dimensional landmarks in each of the first plurality of detected two-dimensional landmarks and the second plurality of detected two-dimensional landmarks, and identifying outlier landmarks in the first plurality of two-dimensional landmarks or in the second plurality of two-dimensional landmarks based on the comparisons.

Other implementations of the above-described methods of the first, second, and third aspects can include corresponding systems and apparatus configured to perform the actions of the methods, and computer programs that are tangibly embodied on machine-readable data storage devices and that configure data processing apparatus to perform the actions.

The details of one or more implementations are set forth in the accompanying drawings and the description below. Other features and advantages of the implementations will be apparent from the description and drawings, and from the claims.

DESCRIPTION OF DRAWINGS

Like reference symbols in the various drawings indicate like elements.

DETAILED DESCRIPTION

Figure 1:
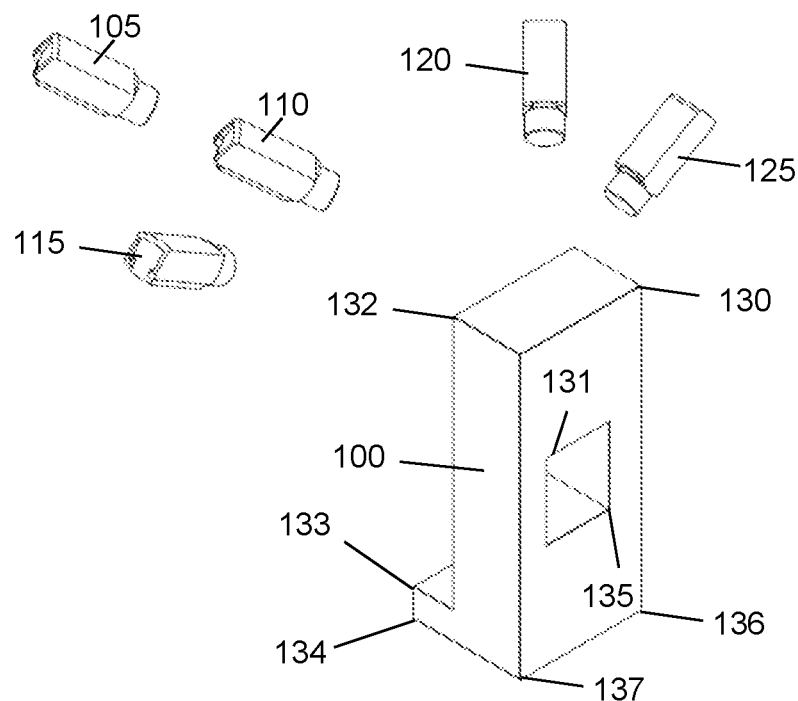
FIG. 1 is a schematic representation of the acquisition of a collection of different images of an object.

FIG. 1 is a schematic representation of the acquisition of a collection of different images of an object 100. For illustrative purposes, object 100 is shown as an assembly of ideal, unmarked geometric parts (e.g., cubes, polyhedrons, parallelepipeds, etc.). However, in real-world applications, objects will generally have a more complicated shape and be textured or otherwise marked, e.g., with ornamental decoration, wear marks, or other markings upon the underlying shape.

A collection of one or more imaging devices (here, illustrated as cameras 105, 110, 115, 120, 125) can be disposed successively or simultaneously at different relative positions around object 100 and oriented at different relative angles with respect to object 100. The positions can be distributed in 3-dimensional space around object 100. The orientations can also vary in 3-dimensions, i.e., the Euler angles (or yaw, pitch, and roll) can all vary. The relative positioning and orientation of a camera 105, 110, 115, 120, 125 with respect to object 100 can be referred to as the relative pose between the camera and the object. Since cameras 105, 110, 115, 120, 125 have different relative poses, cameras 105, 110, 115, 120, 125 will each acquire different images of object 100.

The relative pose between the camera and the object can be defined in different frames of reference. For example, a frame of reference for the relative pose of the camera and the object can be defined based solely the camera and the object, e.g., by drawing a straight line between a point on the object and a point on the camera and choosing a point along this line. The length of this line defines the distance between the object and the camera and the line can be used to define angular inclinations of the camera and the object. As another example, a frame of reference can be defined relative to other points of reference such as, e.g., a position on the ground or other location. Distances and orientations that are defined relative to these points can be converted to distances and orientations in a frame of reference that is defined based solely the camera and the object.

Returning to FIG. 2, even a simplified object like object 100 includes a number of landmarks 130, 131, 132, 133, 134, 135, 136, . . . . A landmark is a position of interest on object 100. Landmarks can be positioned at geometric locations on an object or at a marking upon the underlying geometric shape. As discussed further below, landmarks can be used for determining the pose of the object. Landmarks can also be used for other types of image processing, e.g., for classifying the object, for extracting features of the object, for locating other structures on the object (geometric structures or markings), for assessing damage to the object, and/or for serving as point of origin from which measurements can be made in these and other image processing techniques.

Figure 2:
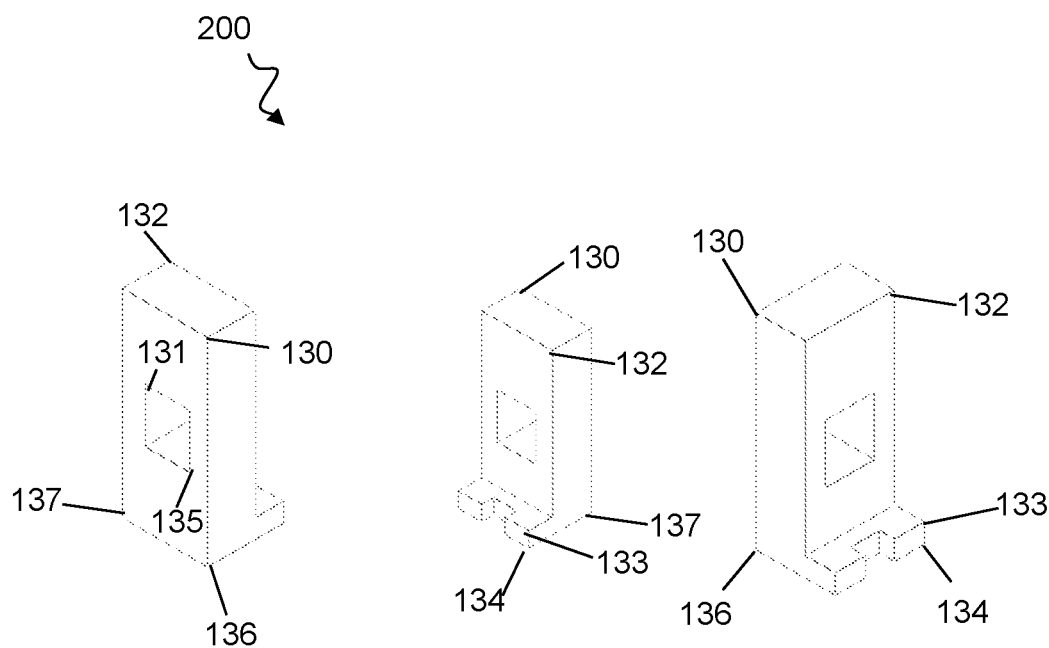
FIG. 2 is a schematic representation of a collection of two-dimensional images acquired by one or more cameras.

FIG. 2 is a schematic representation of a collection 200 of two-dimensional images acquired by one or more cameras, such as cameras 105, 110, 115, 120, 125 (FIG. 1). The images in collection 200 show object 100 at different relative poses. Landmarks like landmarks 130, 131, 132, 133, 134, 135, 136, . . . appear at different locations in different images—if they appear at all. For example, in the leftmost image in collection 200, landmarks 133, 134 are obscured by the remainder of object 100. In contrast, in the rightmost image 210, landmarks 131, 135, 137 are obscured by the remainder of object 100.

Figure 3:
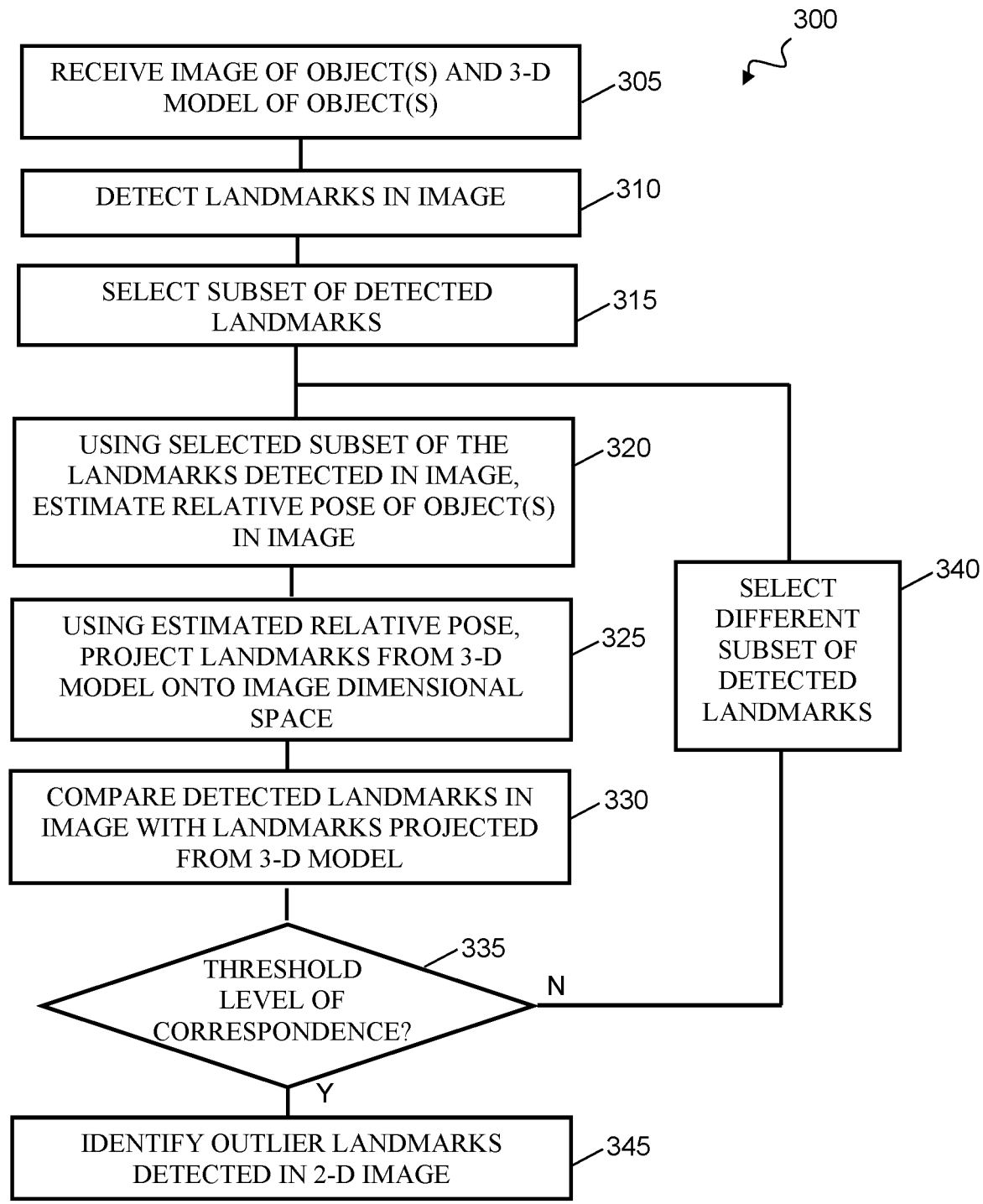
FIG. 3 is a flowchart of a computer-implemented process for processing two-dimensional images of objects.

FIG. 3 is a flowchart of a computer-implemented process 300 for processing two-dimensional images of objects. The two-dimensional images can include arrangements of multiple objects and/or deformed objects. Process 300 can be part of a process for identifying, e.g., portions of individual objects that are deformed, objects or portions of objects that have moved from one image to the next, and/or portions of objects that are obscured in an image. Process 300 can be performed by one or more data processing devices that perform data processing activities. The activities of process 300 can be performed in accordance with the logic of a set of machine-readable instructions, a hardware assembly, or a combination of these and/or other instructions.

At 305, the device performing process 300 receives an image of an object and a three-dimensional model of the object in the image.

The received image can be acquired by any of a number of different types of cameras or other imaging devices. For example, the image can be acquired by a smart phone, a digital camera, a medical imaging device, a LIDAR camera, an X-ray machine, or the like. In some implementations, a single received image combines different types of information, e.g., information acquired by multiple imaging devices or information acquired using different imaging mechanisms. For example, a single received image can combine information acquired from different poses (stereoscopic imaging), information acquired from the same pose but with different dynamic ranges (high-dynamic-range imaging), information acquired using polarizing filters, or the like. The received image can thus include two dimensions of information, three dimensions of information, or more dimensions of information. The information can include stereoscopic information, polarization information, high-dynamic-range information, depth scanning information (e.g., LIDAR), polarization and other filters, masks, labels on pixel content, vector field of transition (e.g. color, shape) information, movement information, or the like. In some instances, the information is acquired using a single imaging device (e.g., a stereoscopic camera). In other instances, post-acquisition processing is performed to combine information acquired using multiple imaging devices.

In some implementations, the device performing process 300 acquires the received image itself. In other implementations, the image is received from the imaging device either directly or by way of one or more intermediate devices. For example, the image can be communicated to the device performing process 300 using wired or wireless data communications, either as a discrete image or as part of a video stream.

Three-dimensional (3-D) models represent objects in three-dimensional space, generally divorced from any frame of reference. 3-D models can be created manually, algorithmically (procedural modeling), or by scanning real objects. Surfaces in a 3-D model may be defined with texture mapping. In some cases, a 3-D model of an object can generated (e.g., using computer-aided design (CAD) software) as an assembly of constituent parts or portions of the object. For example, a 3-D model of an automobile can be formed as an assembly of 3-D CAD models of the constituent automotive parts or a 3-D model of the mouth can be formed as an assembly of models of the palate and crowns of the teeth in the mouth. However, in other cases, a 3-D model can start as a unitary whole that is subdivided into constituent parts. For example, a 3-D model of an organ can be divided into various constituent parts under the direction of a medical or other professional.

Although the present disclosure refers to a three-dimensional model "of the object" or "of the same object," three-dimensional models are generally not a model of a single physical instance of an object. Rather, three-dimensional models are generally a generic and idealized model of different objects that share common characteristics. Examples include three-dimensional models of cars or appliances of a certain make and model—without considering details of particulars instances of the cars or appliances. Other examples include three-dimensional models of different organs or teeth of individuals having certain physiological and/or demographic characteristics (e.g., age, gender, height, weight, jaw width, and the like).

In some cases, the image and the 3-D model are of the same portion of an object. In some cases, the image includes multiple objects (or portions of multiple objects) and multiple three-dimensional models can be received. The exact nature of the object(s)—or portion(s) of the object(s)—can depend on the application context. Example objects include automobiles, internal organs, teeth, objects in a landscape (e.g., houses, streets, lampposts, rivers, etc.), and the like. Considering these example objects, example portions of objects include

- parts of an automobile (e.g., bumpers, wheels, body panels, the hood, windshields, and side panels),
- parts of an organ (e.g., chambers, valves, cavities, lobes, canals, membranes, and vasculature),
- parts of teeth (e.g., crown, necks, roots),
- parts of objects in a landscape (e.g., house roofs, intersections, river bends) and the like. Other objects and other portions of objects are suitable in other application contexts. Because of this diversity and for the sake of brevity, an object or a portion an object will be referred to herein collectively as an "object."

Either the device performing process 300 or one or more other devices can use any of a number of different approaches to ensure that the received image and three-dimensional model are of the same object. For example, in some implementations, metadata associated with the received image can characterize the object in the image. For example, a make and model year can be associated with a 2-D image of an automobile. A patient name or physiological and demographic characteristics can be associated with a medical or dental image. A GPS coordinate can be associated with an image of a landscape. Such metadata can be used to identify a 3-D model of the same object. For example, a pre-existing library of 3-D automobile models can be searched for a 3-D model of the same make and model car. Demographic and/or physiological information can be used to search for 3-D models that are representative of patients' having those demographic and/or physiological characteristics. In some cases, the three-dimensional model can be acquired from the same instance of the object and the metadata associated with the image can be used. For example, a patient name can be used to search for a previously-generated 3-D image of the patient's physiology or to ensure correspondence between medical images acquired using one imaging modality and 3-D images acquired using a different, three-dimensional imaging modality.

At 310, the device performing process 300 detects landmarks in the received image of the object. Landmarks can be detected using, e.g., a machine learning model. An example machine learning model for landmark detection is the detectron2 available at https://github.com/facebookresearch/detectron2. In some implementations, the landmark detection machine learning models can generate, for each landmark, a detection score or other characterization of how certain it is that a landmark has been properly detected.

At 315, the device performing process 300 selects a proper subset of the landmarks detected in the received image of the object. In some implementations, the selection of landmarks is random. In other implementations, landmark selection is not random and one or more parameters guide the selection of landmarks. For example, in some implementations, the device performing process 300 can preferentially select landmarks that have certain positional characteristics in the received image. For example, the device performing process 300 can preferentially select landmarks that are relatively far away from one another or distributed relatively evenly across the field of view in the received image. As another example, in implementations where the landmark detection machine learning model generates a characterization of how certain it is that different landmarks have been properly detected, the device performing process 300 can preferentially select landmarks that were detected with a relatively higher certainty. As another example, the selection of landmarks can be guided by combinations of positioning, certainty, and/or other parameters.

At 320, the device performing process 300 estimates a relative pose of the object in the received image using the selected landmarks. The relative pose can be estimated using, e.g., a machine learning model. For example, a pose estimator that relies upon landmark detection is OpenCV's functionality SolvePNP described at https://docs.opencv.org/master/d7/d53/tutorial_py_pose.html.

As another example, the relative poses can be estimated using forward prediction from derived inverse models. An example is described in the publication entitled "iNeRF: Inverting Neural Radiance Fields for Pose Estimation" by Yen-Chen Lin et al. (arXiv:2012.05877v3, 10 Aug. 2021), the contents of which are incorporated herein by reference. Available at https://api.semanticscholar.org/CorpusID_228083990).

In some implementations, the quality of the pose estimate can be scored or otherwise characterized. For example, in some implementations, a binary valid/invalid characterization of the quality of the pose estimate can be generated. "Valid" poses are those of sufficient quality, whereas "invalid" poses are those of insufficient quality. The criteria for invalidating a pose prediction can be established based on criteria that reflect real-world conditions in which the received image is likely to be taken. The criteria can be tailored according to the nature of the object. For example, for a pose estimate in which the object is an automobile:

- the camera should be at an altitude of between 0 meters and 5 meter relative to the ground under the automobile,
- the camera should be within 20 meters of the automobile,
- the roll of the camera relative to the ground under the automobile is small (e.g., less than +/−10 degrees), and
- the boundary of the automobile should largely match the boundary of the automobile that would result from the predicted pose.

If a pose estimate does not satisfy such criteria, then the pose prediction can be designated as invalid.

As another example, in some implementations, non-binary and more granular characterizations of the quality of the pose estimate can be generated. For example, a further machine-learning model can be used to detect an outline of the object in a received two-dimensional image. Further, the estimated pose can be used to project the 3-D model of the object to form a surrogate two-dimensional image of the object at the estimated pose. The outline detected from the received two-dimensional image can be compared to an outline of the object in the surrogate two-dimensional image to characterize the quality of the pose estimate. In some implementations, the result can characterize the quality of the pose estimate on the basis of the object as a whole. For example, the correspondence between the outlines of the entire object in the two images can be characterized. In other implementations, the result can characterize the quality of the pose estimate on the basis of portions or regions of the object. For example, the correspondence between the outlines of only a portion or region of a larger object can be characterized. As an aside, such outline comparisons can also be used to generate binary valid/invalid characterizations of the quality of the pose estimate.

As yet another example, in some implementations, the quality of the pose estimate can be estimated from the context surrounding individual landmarks. For example, the context of a landmark that was detected in the received image can be compared to the context of what is believed to be a corresponding landmark in a surrogate image formed from the 3-D model. For example, 3-D landmarks of the object from the 3-D model can be projected onto a two- or three-dimensional surrogate image at the estimated pose. The context of such landmarks can include, e.g., the geometry and/or visual characteristics of features surrounding the landmark such as, e.g., colors, structure, patterns, optical properties (e.g., reflectivity, polarization), the size of typical adjacent structures, and the like. In some implementations, these characteristics are learned from example images or computed from 3-D models (e.g. a door handle typically is on a door, a door has a certain separation from other parts of the car, etc.).

As yet another example, in some implementations, the quality of a pose estimate can be characterized by estimating the pose multiple times and comparing the different pose estimates. For example, different proper subsets of the landmarks detected in the received image of the object can be selected, e.g., at 315. The relative pose of the object in the received image can be estimated multiple times using the different proper subsets to determine the stability of the different pose estimates, i.e., how much the different pose estimates deviate from one another. In some implementations, stability is assessed, e.g., using landmarks from a portion of the received image, rather than the entirety of the received image. For example, the portion can be defined to exclude landmarks on an object of interest or other highly variable part of the received image. In such cases, the landmarks used to estimate quality of the pose estimate are isolated from other, more variable, landmarks. If the quality of the pose estimate is insufficient, the pose can be re-estimated until the quality is sufficient. For example, process 300 can return to 315 to select a different subset of landmarks and the pose re-estimated using the different subset. In some instances, process 300 may return to 310 to detect additional landmarks or detect landmarks using a different approach, e.g., a different or tweaked machine-learning model. If the quality of the pose estimate remains insufficient, process 300 may be halted for a given received image and a different image may be received and used.

At 325, the device performing process 300 uses the three-dimensional model of the object received at 305 and the relative pose estimated at 320 to project landmarks from the three-dimensional model onto the same dimensional space as the received image. In essence, computations performed by the device that implements process 300 orient and position the three-dimensional model consistent with the relative pose estimated at 320. Three-dimensional landmarks on the three-dimensional model that would be visible in a hypothetical received image formed in the same dimensional space as the received image can be identified.

After projection, corresponding projected and detected landmarks can be identified. For example, the contexts of projected and detected landmarks can be compared to identify corresponding landmarks. The context of such landmarks can include, e.g., the geometry and/or visual characteristics of features surrounding the landmark such as, e.g., colors, structure, patterns, optical properties (e.g., reflectivity, polarization), the size of typical adjacent structures, and the like. In some implementations, these characteristics are learned from example images or computed from 3-D models (e.g. a door handle typically is on a door, a door has a certain separation from other parts of the car, etc.).

At 330, the device performing process 300 compares the positions or other characteristics of the landmarks that have been projected onto the hypothetical image at 325 with the positions or other characteristics of the corresponding landmarks detected in the received image at 310. The comparisons are performed on a landmark-by-landmark basis in at least of the some of the dimensions onto which the three-dimensional model was projected at 325.

The results of the comparison can be expressed in a variety of different ways, depending on the particular characteristics that are compared. For example, assume a 2-D or 3-D position of each individual landmark projected at 325 is compared with a 2-D or 3-D position of a corresponding individual landmark detected at 310. The 2-D or 3-D positional differences can be expressed both in terms of magnitude and direction. The magnitude of the separation between the landmarks can be expressed, e.g., in pixels, as a percentage of the width of the received image, or otherwise. As further examples, differences in color can be expressed in wavenumbers, differences in reflectivity can be expressed in radiometry units, and differences in polarization can be expressed as angular differences.

In some implementations, the device performing process 300 can also generate values that characterize combinations of the differences of several corresponding landmarks. For example, an average difference in 2-D or 3-D position or an algebraic or vector sum of the differences in 2-D or 3-D position for a set of corresponding landmarks can be generated and used in subsequent activities.

At 335, the device performing process 300 determines whether a threshold level of correspondence exists between the characteristics of the landmarks that have been projected onto the hypothetical image at 325 and the characteristics of the landmarks detected in the received image at 310. Both the threshold level—and the characteristic differences that are compared to the threshold level—can be on a landmark-by-landmark basis or a combined basis. For example, a number count or a percentage of the corresponding landmarks that have individual differences below a threshold can be used to determine whether a threshold level of correspondence exists. As another example, a vector sum of the 2-D or 3-D positional differences of several corresponding landmarks can be compared with a threshold level of correspondence to determine whether a threshold level of correspondence exists.

In either case, the threshold level can be expressed in objective terms that are independent of a particular instance of process 300 or in subjective terms that are tailored to the particular instance of process 300. For example, in some implementations, an objective threshold level—such as, e.g., a certain number of pixels or a percentage of the width of the received image—can be applied to multiple instances of process 300. In other implementations, a subjective threshold level—such as, e.g., a standard deviation of 2-D or 3-D positional differences or a value that is tailored to the certainty that landmarks were been properly detected in the received image—can be applied during different instances of process 300.

In response to determining that a threshold level of correspondence does not exist, the device performing process 300 selects, at 340, a different proper subset of the landmarks detected in the received image (i.e., a different proper subset of the landmarks detected at 310). In some implementations, the landmarks are selected at random. In other implementations, landmark selection is not random and landmark selection is guided. In addition to the parameters described above at 315, the results of landmark-by-landmark comparisons at 330 can also guide selection of the different subset of landmarks. For example, in some implementations, if the differences between a landmark projected at 325 and a corresponding individual landmark detected at 310 is relatively small, then that individual landmark can be preferentially included in the different proper subset. As another example, in some implementations, if the difference between a landmark projected at 325 and a corresponding individual landmark detected at 310 is relatively large, then that individual landmark can be excluded from the different proper subset. For example, with reference to histogram 700 (FIG. 7), landmarks from cluster 720 of bars can be selected for the different proper subset whereas landmarks from bar 715 can be excluded from the different proper subset.

After selection of the different proper subset at 340, the device performing process 300 estimates a new relative pose of the object using the different proper subset at 320, projects landmarks from the 3-D model onto the dimensional space of the received image using the new relative pose at 325, and compares the positions of the landmarks at 330. This can be repeated until it is determined at 335 that a threshold level of correspondence exists.

In response to determining that a threshold level of correspondence exists, the device performing process 300 identifies, at 345, outlier landmarks amongst the landmarks detected in the received image. The outlier landmarks can be detected from amongst all of the landmarks detected at 310, from amongst the landmarks in the subset that provides a threshold level of correspondence at 335, or from amongst a different subset of the landmarks detected at 310.

The outlier landmarks can be detected in a number of different ways. For example, in some implementations, a histogram (e.g., histogram 700, FIG. 7) of the differences between corresponding landmarks can be generated and used to identify outliers. As another example, a threshold value difference can be used to identify outliers. In some implementations, the threshold value difference can be expressed in objective terms (e.g., more than a certain number of pixels or percentage of the width of the received image). In some implementations, the threshold value positional difference can be expressed in subjective terms, e.g., in terms that are referenced to the particular instance of process 300. For example, a standard deviation from the average difference or the direction vis-à-vis the 2-D or 3-D directional differences of other corresponding landmarks in a particular instance of process 300 can be used to identify outliers.

The identified outlier landmarks can be applied to various different activities that depend on the operational context. For example, in operational contexts where damage or deformation of an object instance is to be identified, the outlier landmarks can be used to identify a damaged or deformed portion of the object instance. For example, a cluster of spatially close outliers can indicate that the underlying portion of the object instance is damaged or deformed in a vicinity. As another example, the outlier landmarks can be used to characterize the extent of damage or deformation. For example, the magnitude of the positional differences can be taken as an indication of the extent of the damage or deformation—as can color or other optical differences. If the differences are relatively small, this can be taken as an indication of normal wear and tear of the object instance. On the other hand, if the differences are relatively large, this can be taken as an indication of more severe damage to the object instance.

As another example, in operational contexts where movement of a portion of an object instance is to be identified, the outlier landmarks can be used to characterize the movement. For example, the magnitude and direction of the positional differences can be taken as an indication of the magnitude and direction of the movement. Examples of such operational contexts include contexts in which the motion of, e.g., a movable arm or other joint of a robot or a part of other automated machinery is to be identified.

As yet another example, in operational contexts where obscuration of a portion of object instance is to be identified, outlier landmarks can be used to characterize the obscured portion. For example, if the obscuration is an ornamental decoration or even a new coat of paint, color or other optical differences can be used. When 2-D or 3-D positional differences are used to identify an obscuration, the outlier landmarks can be outliers in the sense that they are not detected in a received image. In some implementations, the position of outlier landmarks can be used to define rough boundaries of the obscuring body. In some implementations, multiple performances of process 300 with different images can be used to characterize movement of the obscuring body between the images, as different landmarks become undetected outliers.

As another example, in some operational contexts, the deformation of soft bodies is to be identified. In such contexts, the outlier landmarks can be used to characterize deformation of objects, e.g., using a "wire frame" 3-D model to establish the kinematic arrangement of the wire frame using the outlier landmarks.

As another example, in some operational contexts, the growth of an object is to be identified. In such contexts, the nature of the outlier landmarks can be used to identify the type of growth. For example, if the volume of an object is growing in three dimensions, then 2-D positional differences of the corresponding two-dimensional landmarks may reflect their distance from a reference position on the object. As another example, if an object is increasing in only one dimension (e.g., getting longer), then 2-D positional differences may reflect the distance from a reference line or plane of the object. In such cases, the "outlier" landmarks may encompass a relatively large fraction—or even a majority—of the landmarks.

Figure 4:
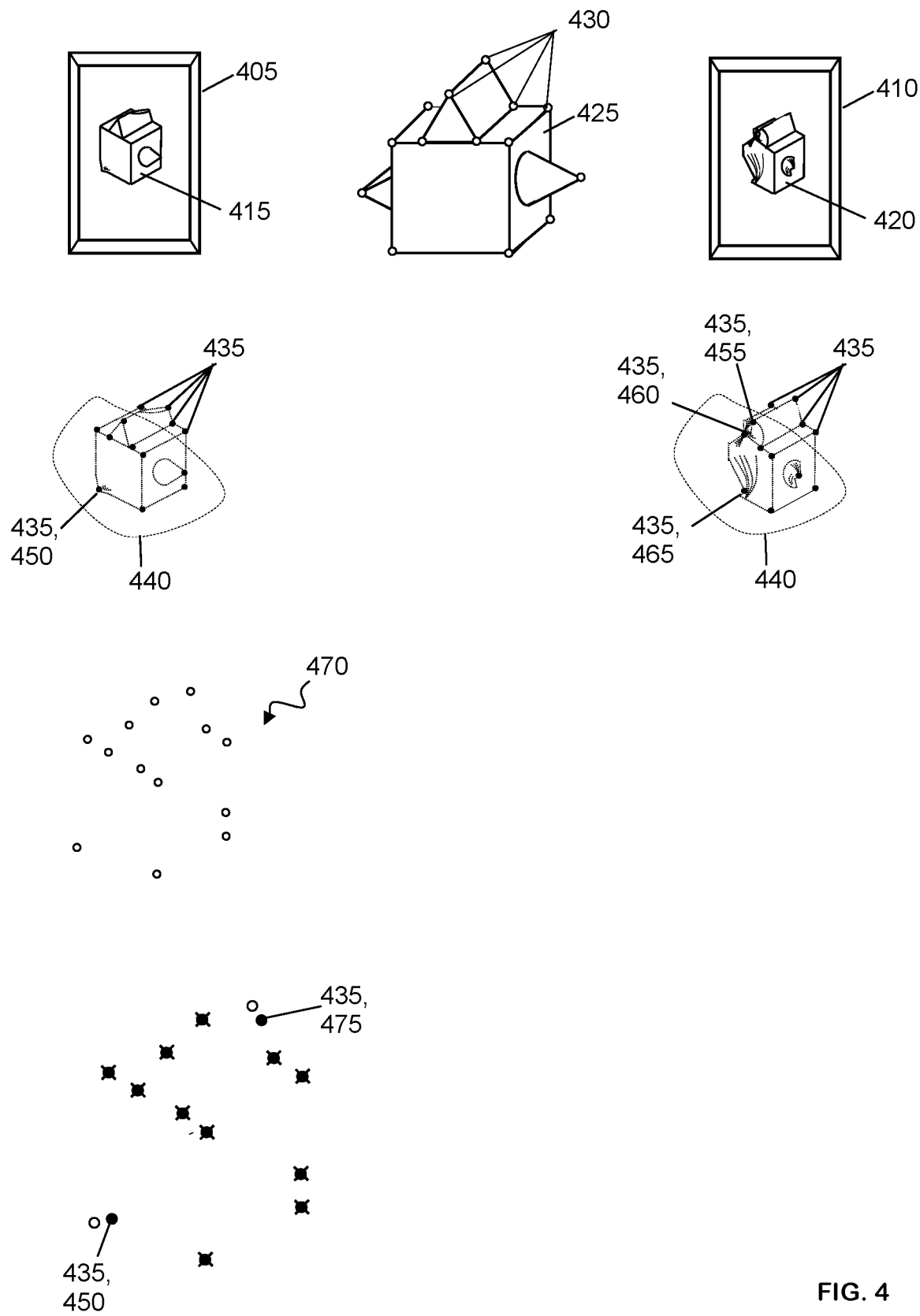
FIG. 4 is a schematic representation of implementations of portions of the process of FIG. 3, performed with two different images of two different instances of the same object.

FIG. 4 is a schematic representation of illustrative implementations of portions of process 300, performed with two different two-dimensional images of two different instances of the same object. As discussed above, the images received at 305 can include information in multi-dimensional space and comparisons can be made in such dimensions. However, for didactic purposes, the illustrative implementations of portions of process 300 are performed with a first two-dimensional image 405 and a second two-dimensional image 410. Further, all comparisons are in two-dimensional space.

Image 405 is a 2-D image of an instance of an instance 415 of an object that is deformed in relatively minor ways. Image 410 is a 2-D image of an instance 420 of the same object that is deformed in relatively more serious ways. Both object instances 415, 420 are represented by the same 3-D model 425. In particular, 3-D model 425 is a generic and idealized representation of the object instances 415, 420 in three-dimensional space. For example, 3-D model 425 can be, e.g., a CAD model or a procedural model of the object without any deformation or obscuration.

As discussed above, 2-D images 405, 410 and 3-D model 425 are received by one or more data processing devices that perform data processing activities at 305 (FIG. 3). In the schematic illustration, a collection of three-dimensional landmarks 430 are denoted on 3-D model 425 as an arrangement of hollow dots at different positions on 3-D model 425. Three-dimensional landmarks 430 are points of interest on 3-D model 425. In some implementations, three-dimensional landmarks 430 are identified in metadata that accompanies 3-D model 425 when 3-D model 425 is received at 305 (FIG. 3). In other implementations, a computer-implemented process can be used to annotate landmarks on 3-D model 425. An example of such a process is process 800 (FIG. 8) described below. The receiving device detects a collection of two-dimensional landmarks 435 on images 405, 410 at 310 (FIG. 3). For didactic purposes, 2-D landmarks 435 are illustrated as a two-dimensional arrangement of solid, black dots at different positions along a dashed outline of object instances 415, 420. In real-world implementations, such arrangements are unnecessary and the position of 2-D landmarks 435 can be denoted with 2-D position coordinates or otherwise. In the illustrated schematic, 2-D landmarks 435 are corners or other edge features on object instances 415, 420. This is not necessarily the case. 2-D landmarks 435 can be positioned elsewhere on object instances 415, 420. For example, 2-D landmarks 435 can be positioned at joints between different components, at ornamental features on surfaces of object instances 415, 420, or elsewhere on object instances 415, 420.

The receiving device also selects subsets of the 2-D landmarks 435 in each collection of 2-D landmarks 435 at 315 (FIG. 3). For didactic purposes, a subset of 2-D landmarks 435 are selected from similar contiguous areas 440 within both images 405, 410. However, this is not necessarily the case. The selected 2-D landmarks 435 can be distributed across images 405, 410—randomly or otherwise—such that no "area" as such from which landmarks are selected exists.

Using the selected subsets of 2-D landmarks 435, the device estimates the relative pose of object instances 415, 420 within images 405, 410 at 320 (FIG. 3). As for the selected subset of 2-D landmarks 435 from image 405, they are found in portions of object instance 415 that are either undeformed or only deformed to a relatively small extent. For example, 2-D landmark 450 is found near a portion of object instance 415 that is deformed by a relatively small extent. In contrast, as for the selected subset of 2-D landmarks 435 from image 410, the 2-D landmarks 435 are found in portions of object instance 420 that are deformed to a relatively large extent. For example, 2-D landmarks 455, 460, 465 are found near portions of object instance 415 that are deformed by relatively large extents.

Since the 2-D landmarks 435 in the subset selected from image 405 are where they are expected to be, the estimated pose of object instance 415 is relatively accurate. Any error in the estimate due to 2-D landmark 450 is relatively small. In contrast, since the 2-D landmarks 435 in the subset selected from image 410 are at positions that deviate greatly from where they are expected to be, the estimated pose of object instance 420 is relatively inaccurate. Indeed, in some cases, pose estimation may return unacceptably inaccurate results or even no result and the pose can be re-estimated, e.g., using a different subset of detected landmarks or landmarks detected landmarks using a different or tweaked machine-learning model.

Using the estimated relative poses, the device projects 3-D landmarks from 3-D model 425 onto a hypothetical two-dimensional image at 325 (FIG. 3). For the pose estimated from image 405, this yields a collection 470 of landmarks. The landmarks in collection 470 are "two-dimensional" in that they are positioned only in two-dimensional space (as opposed to landmarks 430 in three-dimensional space on 3-D model 425). Although the landmarks in collection 470 are two-dimensional, they are also shown in collection 470 as hollow dots to signify their correspondence to the 3-D landmarks 430 on 3-D model 425.

The device compares the positions of the 2-D landmarks 435 detected in image 405 with the position of the 2-D landmarks in collection 470 at 330 (FIG. 3). This comparison is schematically represented at the bottom, left corner of FIG. 4. Where 2-D landmarks in collection 470 overlap or nearly overlap with 2-D landmarks 435, hollow dots are overlaid with an "x." However, where 2-D landmarks 435 and the 2-D landmarks in collection 470 deviate to an illustratable extent, 2-D landmarks 435 are represented by solid, black dots. In the illustrated implementation, two different 2-D landmarks 435—namely, 2-D landmarks 450 and a 2-D landmark 475— deviate to an illustratable extent. The corresponding 2-D landmarks in collection 470 are represented by hollow dots without an "x."

Based on the comparison of the positions of the 2-D landmarks 435 detected in image 405 with the positions of the 2-D landmarks in collection 470, the device determines whether a threshold level of correspondence has been reached at 335 (FIG. 3). Further, the device identifies outlier landmarks (e.g., 2-D landmarks 450, 475) at 345 (FIG. 3).

In the illustrated implementation, no collection of landmarks formed by projecting the pose estimated from image 410 is shown. This is schematic only. A collection of landmarks can be formed and the positions of the 2-D landmarks 435 detected in image 410 can be compared with the positions of the 2-D landmarks in such a collection. The result of such a comparison will however yield greater deviations between the positions of the landmarks. Indeed, in some implementations, it may be difficult to identify corresponding landmarks.

When faced with positional deviations that exceed a threshold level of correspondence or other indication of inaccuracy, the device selects a different subset of landmarks 435 from image 410 at 335 (FIG. 3). Once again, the relative pose of object 420 can be estimated using the selected subset at 320 (FIG. 3), 3-D landmarks can be projected from 3-D model 425 onto a two-dimensional image using the estimated relative pose at 325 (FIG. 3), and the positions of the 2-D landmarks compared with the position of the 2-D landmarks formed by projecting the 3-D landmarks at 330 (FIG. 3). This process can repeat until the positional deviations do not exceed the threshold level of correspondence.

Figure 5:
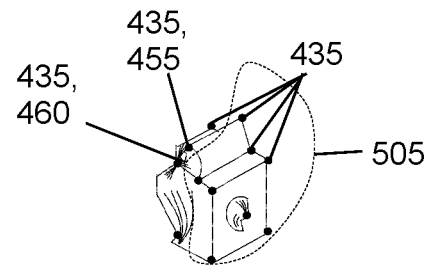
FIG. 5 schematically represents the selection of a different subset of two-dimensional landmarks during performance of portions of the process of FIG. 3.
Figure 5:
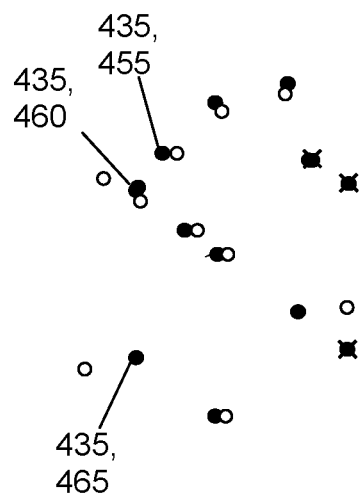

FIG. 5 schematically represents the selection of a different subset of 2-D landmarks 435 detected in image 410 and that may prove suitable for estimating the relative pose of object instance 420 accurately. In particular, the selected landmarks are in an area 505 that encompassed portions of object instance 420 that are either undeformed or only deformed to a relatively small extent. Since the 2-D landmarks 435 in area 505 are where they are expected to be, the estimated pose of object instance 420 can be relatively accurate.

As before, the positions of the 2-D landmarks 435 detected in image 410 can be compared with the position of the 2-D landmarks projected from 3-D model 425 at 330 (FIG. 3). This comparison is schematically represented at the bottom of FIG. 5, where overlapping projected and detected are designated using hollow dots overlaid with an "x." The remainder of the detected 2-D landmarks 435 are represented by solid, black dots. The remainder of the projected 3-D landmarks are represented by hollow dots.

Figure 6:
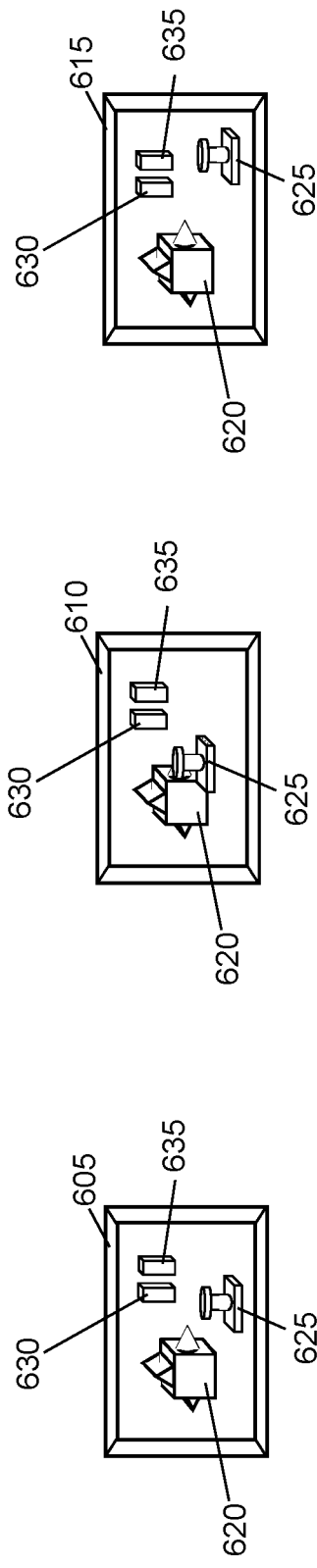
FIG. 6 is a schematic representation of implementations of portions of the process of FIG. 3, performed with three different images of four different objects.
Figure 6:
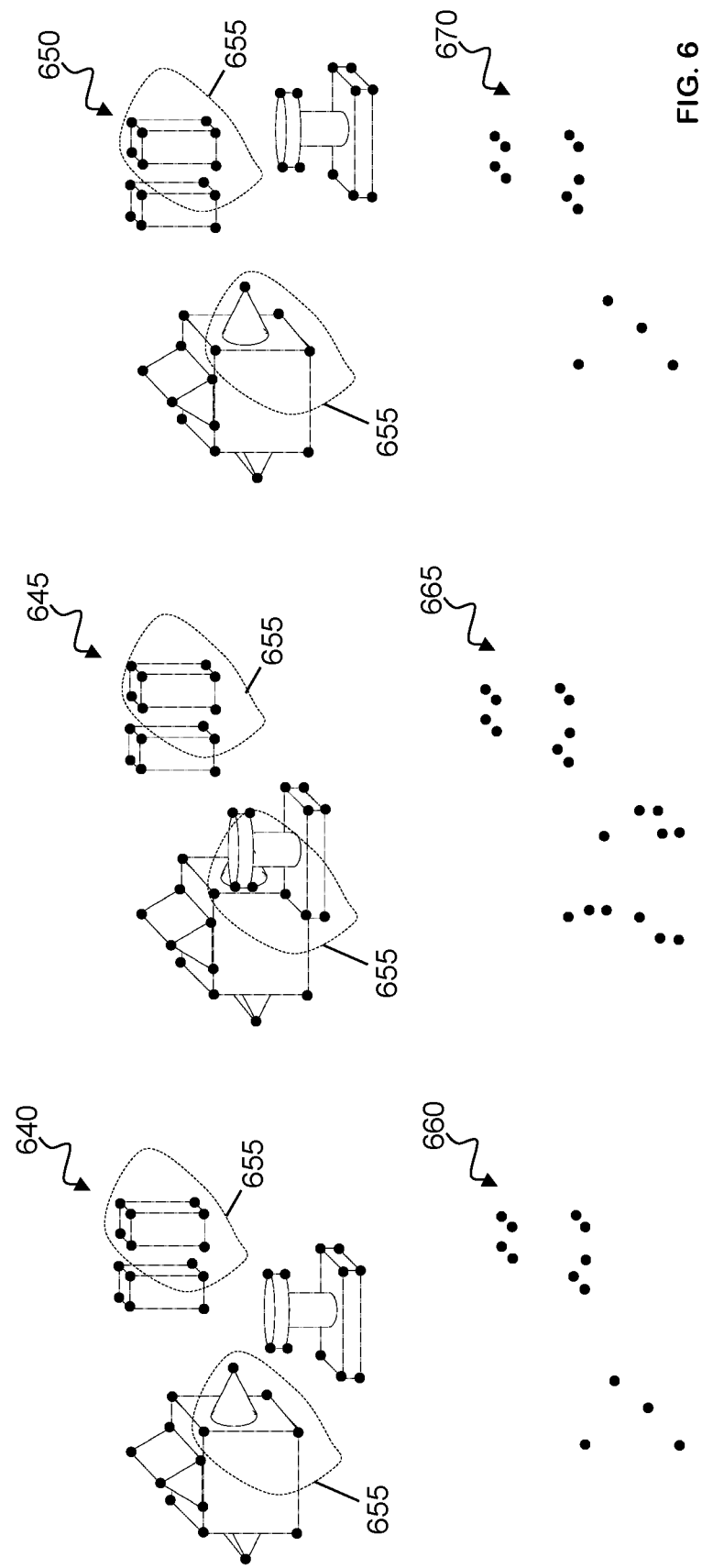

FIG. 6 is a schematic representation of implementations of portions of process 300, performed with three different images 605, 610, 615 of four different objects 620, 625, 630, 635. Once again, images 605, 610, 615 are illustrated as two-dimensional for didactic purposed. Images 605, 610, 615 differ from each other in that the pose of at least one object 620, 625, 630, 635 differs in the images. In the illustrated implementation, the pose of object 625 differs in images 605, 610, 615. In other implementations, the pose of one or more other objects 620, 630, 635 can differ-regardless of whether the pose of object 625 also differs.

In some implementations, the device that performs process 300 can receive a separate 3-D model of each of objects 620, 625, 630, 635. In other implementations, the device that performs process 300 receives only a single 3-D model of one of objects 620, 625, 630, 635. For example, the device can receive only 3-D model 425 (FIG. 4) of object 620.

The receiving device detects collections 640, 645, 650 of two-dimensional landmarks on images 605, 610, 615 at 310 (FIG. 3). For didactic purposes, 2-D landmarks 640, 645, 650 are again illustrated as a two-dimensional arrangement of solid, black dots at different positions along a dashed outline of object instances 620, 625, 630, 635.

The receiving device also selects subsets 660, 665, 670 of the 2-D landmarks in each collection of 2-D landmarks 640, 645, 650 at 315 (FIG. 3). For didactic purposes, subsets 660, 665, 670 of 2-D landmarks are selected from similar areas 655 within images 605, 610, 615. However, the selected 2-D landmarks can also be distributed across images 605, 610, 615.

Using the selected subsets 660, 665, 670 of 2-D landmarks 640, 645, 650 and the corresponding 3-D model or models, the device estimates the relative pose of at least one object instance 620, 625, 630, 635 within images 605, 610, 615 at 320 (FIG. 3).

In some cases, the subsets 660, 665, 670 of landmarks will be from at least one object 620, 625, 630, 635 and the estimated pose of object 620, 625, 630, 635 will be relatively accurate. For example, referring to subsets 660, 670, a relatively large number of landmarks from object 635 were selected. Assuming that a 3-D model of object 635 were available, the relative pose of object 635 can be estimated relatively accurately.

In other cases, the estimated pose(s) of object 620, 625, 630, 635 will be relatively inaccurate. There are several possible contributions to this inaccuracy, including, e.g.:
  too few landmarks being selected from an object 620, 625, 630, 635 for which there is a corresponding 3-D model,
  a portion of object 620, 625, 630, 635 for which there is a corresponding 3-D mode being obscured, or
  difficulty assigning landmarks to a corresponding 3-D model (e.g., due to damage or deformation).
For example, referring to subset 645, even if a relatively large number of landmarks were selected from object 620, the pose of object 625 obscuring a portion of object 620 may make a pose estimate based on object 620 relatively inaccurate. Indeed, in some cases, pose estimation may return unacceptably inaccurate results or even no result.

Using each the estimated relative poses, the device projects 3-D landmarks from one or more 3-D models onto a two-dimensional image at 325 (FIG. 3), yielding a respective collection of landmarks. The device also compares the positions of the 2-D landmarks 640, 645, 650 detected in images 605, 610, 615 with the position of the 2-D landmarks projected from the 3-D model at 330 (FIG. 3).

Assuming for now that a threshold level of correspondence has been reached, the projection of the 3-D landmarks from the 3-D models onto a two-dimensional image at 325 can be used to identify outlier landmarks in a variety of different ways. For example, with reference to image 610, the comparison of positions of the 2-D landmarks 645 with the position of the 2-D landmarks projected from a 3-D model of object 620 (e.g., 3-D model 525, FIG. 4) will show that a number of landmarks from object 620 were not detected in image 610. If the landmarks from object 620 are not detected at all, this can be taken as an indication that object 620 is partially obscured in image 610. Further, based on the position of the non-detected landmarks, a rough outline of the obscuration can be formed.

As another example, the positions of the 2-D landmarks 640, 645, 650 identified in images 605, 610, 615 can be compared with each other, e.g., to identify that the relative pose of an object has changed. For example, with reference to images 605, 615, a comparison of the positions of 2-D landmarks 640, 650 will show that the positions of the 2-D landmarks from objects 620, 630, 635 are essentially unchanged. In contrast, the positions of the 2-D landmarks from object 625 will essentially unchanged show that the pose of object 625 in images 605, 615 differs.

Figure 7:
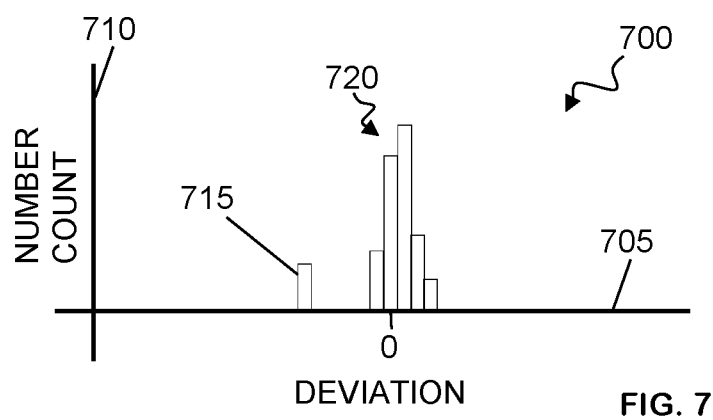
FIG. 7 is a histogram that represents the positional deviations between landmarks detected from a two-dimensional image and landmarks projected from a three-dimensional model.

FIG. 7 is a histogram 700 that represents the deviations between landmarks detected from a received image and landmarks projected from a 3-D model. Although a device that performs the methods described herein will generally not form and display a histogram like histogram 700 as such, histogram 700 illustrates how deviations between corresponding landmarks can play a role in various activities in these methods. As discussed above, the deviations can be 2-D positional deviations, 3-D positional deviations, or deviations in yet another dimension (color, reflectivity, polarization, etc.).

Histogram 700 includes a horizontal axis 705 and a vertical axis 710. Horizontal axis 705 is demarcated into a number of intervals that each encompass a range of deviations between corresponding detected and projected landmarks. For example, one such interval encompasses a zero deviation between the corresponding landmarks—as would be the case if the corresponding landmarks were identical. Position along vertical axis 710 represents the number count of corresponding landmarks having a deviation within each interval. Bars that extend further upward from horizontal axis 705 indicate that the number count of corresponding landmarks within the deviation range of horizontal axis 705 spanned by that bar is higher than the number count in bars that do not extend as far from horizontal axis 705. For example, for most of deviation range of horizontal axis 705, the number count of corresponding landmarks appears to be zero. However, a discernable number of corresponding landmarks have deviations in the range encompassed by a bar 715. Further, a relatively large number of corresponding landmarks have deviations in the ranges encompassed by the bars in cluster 720.

As discussed above, histogram 700 can illustrate how positional and other deviations between corresponding landmarks can play a role in various activities in these methods. For example, assume that histogram 700 represents the positional deviations of a first subset of corresponding landmarks, such as would result from comparison at 330 (FIG. 3). The corresponding landmarks that have positional deviations in the range encompassed by bar 715 may lower the average correspondence below a threshold level. For example, this could be due not only to the relatively large positional deviations of the corresponding landmarks themselves, but also due to the landmarks detected from the received image making the relative pose estimated at 325 (FIG. 3) more inaccurate.

In this circumstance, a guided selection of a different subset of detected landmarks at 340 (FIG. 3) can exclude the landmarks that have positional deviations from the projected landmarks in the range encompassed by bar 715. Further, detected landmarks that have positional deviations in the range encompassed by the bars in cluster 720 can be preferentially selected. In some circumstances, other detected landmarks (i.e., landmarks with positional deviations that do not appear in in histogram 700) can also be selected.

Such a guided selection can be iterated multiple times and the accuracy of relative pose estimates increased with each iteration. For example, although the bars in cluster 720 may appear close together on the present scale of horizontal axis 705, a change in that scale may indicate that other landmarks that have positional deviations within the range encompassed by the bars in cluster 720 should be excluded from the next subset.

As another example of how deviations between corresponding landmarks can play a role in the methods described herein, assume that histogram 700 represents the deviations of all of corresponding landmarks, such as could be determined after a threshold level of correspondence is reached at 335 (FIG. 3). In this case, the corresponding landmarks that have deviations in the range encompassed by bar 715 can be identified as outliers and can serve as the basis for drawing conclusions about the object instance(s) in the images from which the landmarks were detected. For example, the detected landmarks that have 2-D or 3-D positional deviations in the range encompassed by bar 715 may have been identified from a portion of an object instance that is deformed or damaged. As another example, the detected landmarks that have 2-D or 3-D positional deviations in the range encompassed by bar 715 may have been identified from a portion of an object instance that has moved between images. As yet another example, the detected landmarks that have color or other optical property deviations in the range encompassed by bar 715 may be from an object or an object portion that is obscured in an image, e.g., by an ornamental decoration or a coat of paint.

Figure 8:
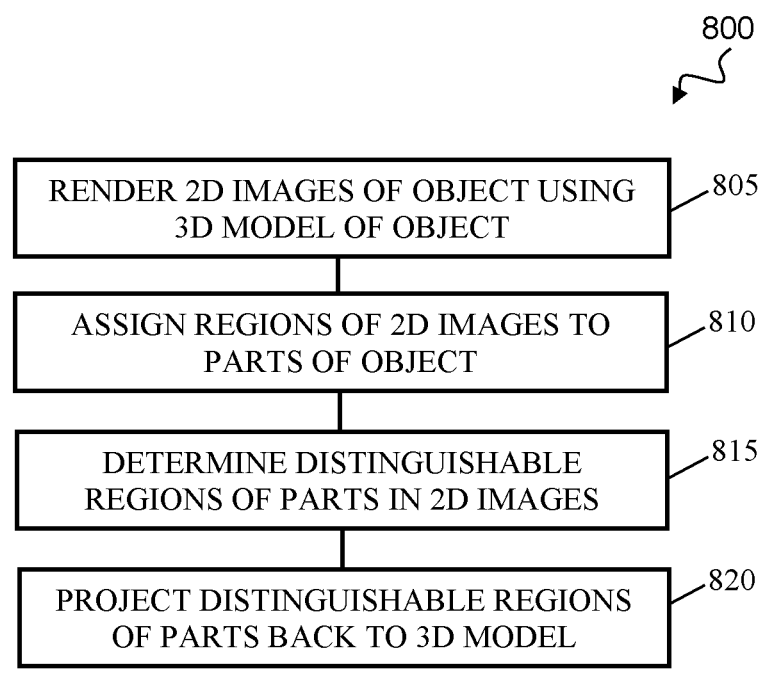
FIG. 8 is a flowchart of a computer-implemented process for annotating landmarks that appear on a 3-D model.

FIG. 8 is a flowchart of a computer-implemented process 800 for annotating landmarks that appear on a 3-D model such as, e.g., 3-D model 425. Process 800 can be performed by one or more data processing devices that perform data processing activities, e.g., in accordance with the logic of a set of machine-readable instructions, a hardware assembly, or a combination of these and/or other instructions. Process 800 can be performed in isolation or in conjunction with other activities. For example, process 800 can be performed in conjunction with process 300 (FIG. 3).

At 805, the system performing process 800 renders a collection of surrogate images of the object using a 3-D model of the object that is formed of constituent parts. The surrogate images are not actual images of a real-world object. Rather, the surrogate images are surrogates for images of the real world object. These surrogate images show the object from a variety of different angles, orientations, and/or dimensions—as if a camera were imaging the object from a variety of different relative poses, generally in the same dimensionality as the image(s) received at 305 in process 300 (FIG. 3).

The surrogate 1 images can be rendered using the 3-D model in a number of ways. For example, ray tracing or other computer graphic techniques can be used. In general, the 3-D model of the object is perturbed for rendering the surrogate images. Different surrogate images can thus illustrate different variations of the 3-D model. In general, the perturbations can mimic real-world variations in the objects—or parts of the objects—that are represented by the 3-D model. For example, in 3-D models of automobiles, the colors of the exterior paint and the interior decor can be perturbed. In some cases, parts (tires, hubcaps, and features like roof carriers) can be added, removed, or replaced. As another example, in 3-D models of organs, physiologically relevant size and relative size variations can be used to perturb the 3-D model.

In some implementations, aspects other than the 3-D model can be perturbed to further vary the surrogate images. In general, the perturbations can mimic real-world variations including, e.g., variations in imaging devices (e.g., camera resolution, zoom, focus, aperture speed), variations in image processing (e.g., digital data compression, chroma subsampling), and variations in imaging conditions (e.g., lighting, weather, background colors and shapes).

In some implementations, the surrogate images are rendered in a frame of reference. The frame of reference can include background features that appear behind the object and foreground features that appear in front of—and possibly obscure part of—the object. In general, the frame of reference will reflect the real-world environment in which the object is likely to be found. For example, an automobile may be rendered in a frame of reference that resembles a parking lot, whereas an organ may be rendered in a physiologically relevant context. The frame of reference can also be varied to further vary the two-dimensional images.

In general, it is desirable that the surrogate images are highly variable. Further, the number of surrogate images—and the extent of the variations—can depend on the complexity of the object and the image processing that is ultimately to be performed using the annotated landmarks on the 3-D model. By way of example, 2000 or more highly variable (in relative pose and permutation) surrogate images of an automobile can be rendered. Because the surrogate images are rendered from a 3-D model, perfect knowledge about the position of the object in the surrogate images can be retained regardless of the number of surrogate images and the extent of variation.

At 810, the system performing process 800 assigns each region of an object shown in the surrogate images to a part of the object. As discussed above, a 3-D model of an object can be divided into distinguishable constituent parts on the basis of function and/or structure. When a surrogate image of the 3-D model is rendered, the part to which each region in the image belongs can be preserved. The regions—which can be pixels or other areas in the two-dimensional image—can thus be assigned to corresponding constituent parts of the 3-D model with perfect knowledge derived from the 3-D model.

At 815, the system performing process 800 determines distinguishable regions of the parts in the surrogate images. A distinguishable region of a part is an area (e.g., a pixel or group of pixels) that can identified in the surrogate images using one or more image processing techniques. For example, in some implementations, corners of the regions in each image that are assigned to the same part are detected using, e.g., a Moravec corner detector or a Harris Corner Detector (https://en.wikipedia.org/wiki/Harris_Corner_Detector). As another example, an image feature detection algorithm such as, e.g. SIFT/SURF/HOG/(https://en.wikipedia.org/wiki/Scale-invariant_feature_transform) can be used to define distinguishable regions.

At 820, the system performing process 800 identifies a collection of landmarks in the 3-D model by projecting the distinguishable regions in the surrogate images back onto the 3-D model. Volumes on the 3-D model that correspond to the distinguishable regions in the surrogate images are identified as landmarks on the 3-D model.

In some implementations, one or more filtering techniques can be applied to reduce the number of these landmarks and to ensure quality—either before or after back-projection onto the 3-D model. For example, in some implementations, regions that are close to an outer boundary of the object in the surrogate image can be discarded prior to back-projection. As another example, back-projections of regions that are too distant from a corresponding part in the 3-D model can be discarded.

In some implementations, only volumes on the 3-D model that satisfy a threshold standard are identified as landmarks. The threshold can be determined in a number of ways. For example, the volumes that are candidate landmarks on the 3-D model and identified by back-projection from different surrogate images rendered with different relative poses and perturbations can be collected. Clusters of candidate landmarks can be identified and outlier candidate landmarks can be discarded. For example, clustering techniques such as the OPTICS algorithm (https://en.wikipedia.org/wiki/OPTICS_algorithm, a variation of DB SCAN https://en.wikipedia.org/wiki/DBSCAN) can be used to identify clusters of candidate landmarks. The effectiveness of the clustering can be evaluated using, e.g., Calinski-Harabasz index (i.e., the Variance Ratio Criterion) or other criterion. In some implementations, the clustering techniques can be selected and/or tailored (e.g., by tailoring hyper-parameters of the clustering algorithm) to improve the effectiveness of clustering. If needed, candidate landmarks that are in a cluster and closer together than a threshold can be merged. In some implementations, candidate landmarks clusters that are on different parts of the 3-D model can also be merged into a single cluster. In some implementations, the barycenters of several candidate landmarks in a cluster can be designated as a single landmark.

In some implementations, the landmarks in the 3-D model can be filtered on the basis of the accuracy with which their position or other characteristic in surrogate images rendered from the 3-D model can be predicted. For example, if the position of 3-D landmark in a surrogate image is too difficult to predict (e.g., incorrectly predicted above a threshold percent of the time or predicted only with a poor accuracy), then that 3-D landmark can be discarded. As a result, only 3-D landmarks with positions in surrogate images that the landmark predictor can be predict relatively easily will remain.

In some instances, the number of landmarks that are identified can be tailored to a particular data processing activity. The number of landmarks can be tailored in a number of ways, including, e.g.:

at 805, rendering more or fewer surrogate images, especially using more or fewer permutations of the 3-D model;

dividing the 3-D model into more or fewer parts to which regions are assigned at 810;

relaxing or tightening a constraint for considering a region to be distinguishable at 815; and/or relaxing or tightening constraints for filtering landmarks after back-projecting the distinguishable regions onto the 3-D model after 820.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made. Accordingly, other implementations are within the scope of the following claims.

What is claimed is:

1. A method of image processing, the method comprising:
   receiving an image of a physical instance of an object and a three-dimensional model of the object;
   detecting a first plurality of landmarks of the physical instance of the object in the received image;
   estimating a pose of the physical instance of the object in the received image relative to an imaging device that acquired the received image, wherein the relative pose in the received image is estimated from the first plurality of the detected landmarks;
   using the estimated relative pose, projecting landmarks from the three-dimensional model of the object into a dimensional space of the received image of the physical instance of the object;
   comparing, in the dimensional space, characteristics of corresponding of the projected landmarks and the detected landmarks of the first plurality;
   determining, on a landmark-by-landmark basis, whether a threshold level of positional correspondence exists between positions of corresponding of the projected landmarks and the detected landmarks of the first plurality; and
   in response to determining that the threshold level of positional correspondence does not exist:
   again estimating the relative pose of the physical instance of the object in the received image from a second plurality of detected landmarks of the physical instance of the object detected in the received image, wherein at least some of the detected landmarks in the second plurality differ from the detected landmarks in the first plurality,
   using the again-estimated relative pose, projecting landmarks from the three-dimensional model of the object into the dimensional space of the received image of the physical instance of the object,
   comparing characteristics of corresponding of the projected landmarks and the detected landmarks of the second plurality in the dimensional space, and
   determining, on a landmark-by-landmark basis, whether the threshold level of positional correspondence exists between positions of corresponding of the projected landmarks and the detected landmarks of the second plurality.

2. The method of claim 1, wherein the method further comprises:
   detecting a plurality of landmarks of the physical instance of the object in the received image, wherein the detected plurality includes more landmarks than the first plurality of detected landmarks; and
   selecting the first plurality of detected landmarks from amongst the landmarks in the detected plurality.

3. The method of claim 2, wherein the selection of the first plurality of detected landmarks is random.

4. The method of claim 2, wherein the selection of the first plurality of landmarks is guided by a property of the landmarks.

5. The method of claim 3, wherein the property is how certain it is that a given of the landmarks has been properly detected.

6. The method of claim 1, further comprising selecting the second plurality of detected landmarks of the physical instance of the object, wherein selecting the second plurality comprises:
identifying corresponding of the projected landmarks and of the detected landmarks in the first plurality with relatively large positional differences; and
excluding the detected landmarks in the first plurality with the relatively large positional differences from the second plurality.

7. The method of claim 1, further comprising selecting the second plurality of detected landmarks of the physical instance of the object, wherein selecting the second plurality comprises:
identifying corresponding of the projected landmarks and of the detected landmarks in the first plurality with relatively large positional differences; and
excluding, from the second plurality, the detected landmarks in the first plurality that have the relatively large positional differences.

8. The method of claim 1, further comprising selecting the second plurality of detected landmarks of the physical instance of the object, wherein selecting the second plurality comprises:
identifying directions of positional deviations of corresponding of the projected landmarks and of the detected landmarks; and
excluding, from the second plurality of detected landmarks in the first plurality that have a direction of positional deviation that differs from the directions of positional deviation of a majority of the positional deviations of corresponding of the projected landmarks and of the detected landmarks.

9. The method of claim 1, further comprising, in response to determining that the threshold level of positional correspondence does exist:
identifying a subset of the detected landmarks of the physical instance of the object with relatively large deviations from the corresponding projected landmarks; and
drawing a conclusion about the physical instance of the object based on the subset of the detected landmarks.

10. The method of claim 9, wherein drawing the conclusion comprises designating a portion of the physical instance of the object as deformed or damaged.

11. The method of claim 9, wherein drawing the conclusion comprises quantifying a magnitude of the relatively large positional deviations, a direction of the relatively large positional deviations, or both the magnitude and the direction.

12. The method of claim 1, wherein determining whether the threshold level of positional correspondence exists comprises:
combining positional differences of a plurality of corresponding projected landmarks and detected landmarks; and
comparing the combination of the positional differences with a threshold.

13. The method of claim 1, wherein estimating the relative pose of the physical instance of the object comprises:
forming a first estimation of the relative pose of the physical instance of the object in the received image;
determining that a quality of the first relative pose estimation is insufficient; and
in response, forming a second estimation of the relative pose of the physical instance of the object in the received image.

14. The method of claim 1, further comprising:
receiving a second image of the physical instance of the object;
detecting a second plurality of landmarks of the physical instance of the object in the second image acquired by a second imaging device;
estimating a pose of the physical instance of the object in the second image relative to the second imaging device that acquired the second image, wherein the relative pose in the second image is estimated from the second plurality of the detected landmarks in the second image; and
using the estimated relative pose of the physical instance of the object and the estimated relative pose of the physical instance of the object in the second image, projecting landmarks from the three-dimensional model of the object into a dimensional space of the second image.

15. The method of claim 14, further comprising:
comparing, in the dimensional space, characteristics of corresponding of
a) the landmarks projected using the estimated relative pose of the physical instance of the object in the second image, and
b) the second plurality of the detected landmarks in the second image; and
determining whether a threshold level of correspondence exists between the compared characteristics of corresponding of the projected landmarks and the first plurality of the detected landmarks.

16. The method of claim 1, wherein:
the image of the physical instance is a two-dimensional image;
the detected landmarks are two-dimensional landmarks;
the dimensional space of the received image is two-dimensional space; and
the characteristics of corresponding of the projected landmarks and the second plurality of the detected landmarks that are compared are positional characteristics in two-dimensional space.

* * * * *